3,390,323
WELL LOGGING METHODS AND APPARATUS HAVING REVERSIBLE FUNCTION ELECTRODE ARRAYS
James W. Kisling, Houston, Tex., assignor, by mesne assignments, to Schlumberger Technology Corporation, Houston, Tex., a corporation of Texas
Filed July 14, 1965, Ser. No. 471,807
10 Claims. (Cl. 324—10)

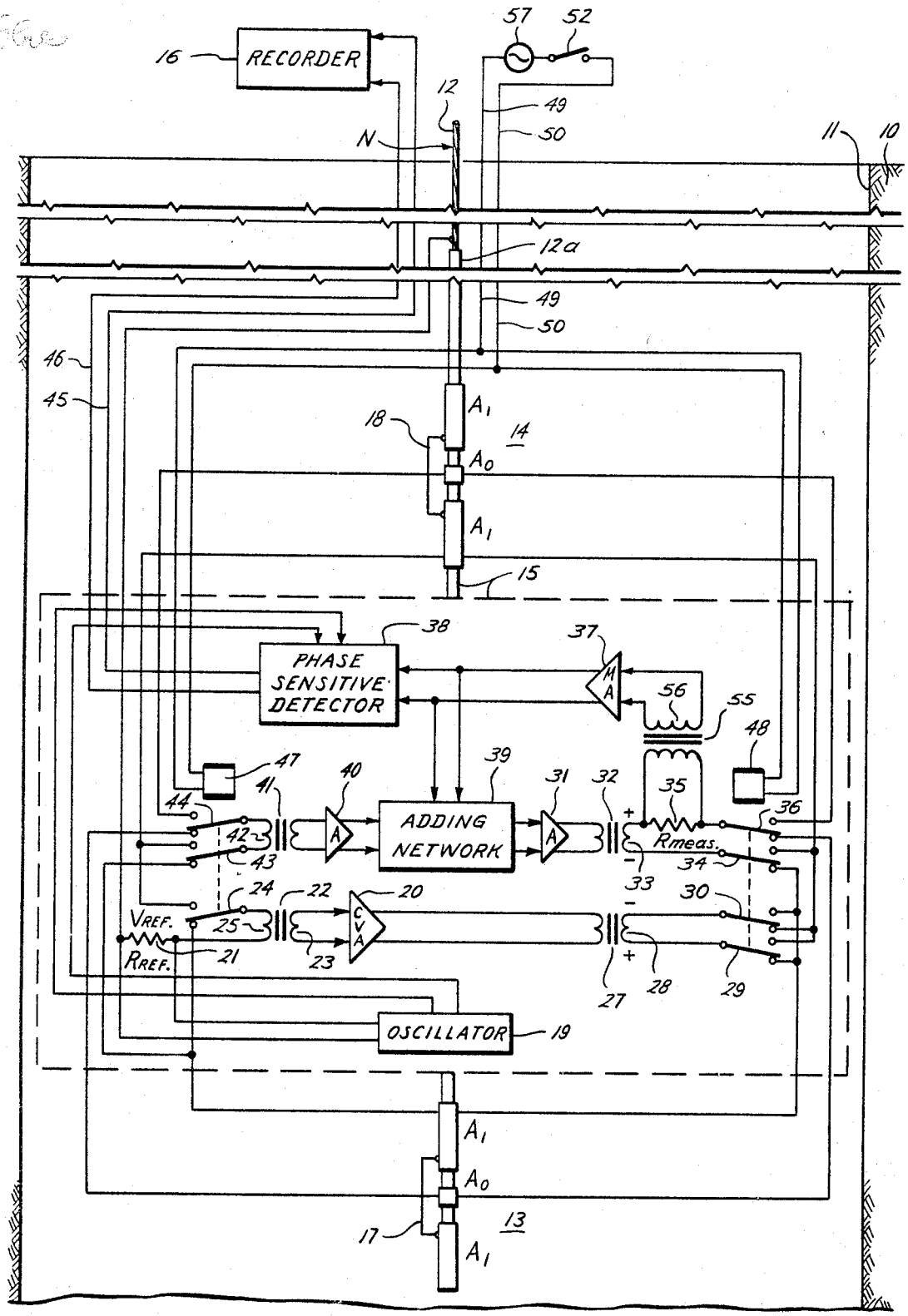

ABSTRACT OF THE DISCLOSURE

The particular embodiments described herein as illustrative of the invention describes methods and apparatus for investigating earth formations with two separate electrode arrays of the "focused" type. A remote potential reference electrode located above both electrode arrays supplies constant voltage approximating zero volts to the downhole investigating apparatus. For logging the principal portion of the borehole, the upper electrode array is utilized as the investigating array and is maintained at a constant potential to shield the remote potential reference electrode from the lower electrode array to which the emitted current is returned. To facilitate logging the bottom of the borehole, switching means are provided for reversing the functions of the two electrode arrays.

---

This invention relates to electrical apparatus for investigating subsurface earth formations traversed by a borehole and, more particularly, to such apparatus of a type utilizing current emitting electrodes which are lowered into the borehole for passing electrical current into the subsurface earth formations for obtaining indications of the resistivity or conductivity characteristics thereof.

One manner in which subsurface earth formations are investigated is by obtaining electrical resistivity or conductivity logs by the so-called "focused" measurements. Such "focused" measurements are obtained by automatically controlling the potential and current distribution in the vicinity of an electrical logging array passed through such borehole so as to obtain desired current flow patterns. In a focused system, a survey current is emitted by a principal survey current emitting electrode disposed in the borehole and this survey current is confined to a path substantially perpendicular to the borehole axis by focusing currents emitted from nearby electrodes on opposite sides of the principal survey electrode.

When investigating subsurface earth formations by obtaining electrical resistivity or conductivity measurements, either the voltage is maintained constant and the current variations measured or the current is maintained constant and the voltage variations measured, or some combination of the two. Whichever method is utilized, it is frequently desirable to have a constant errorless reference voltage approximating zero volts in the downhole electrical circuitry so that the resistivity or conductivity value may be more accurately determined. To obtain this constant errorless reference voltage, a remote potential reference electrode is connected to the downhole electrical circuitry. This remote potential reference electrode cannot be near the survey and focusing electrodes because of the relatively high potential in the vicinity of these electrodes, nor should it be near the current return electrode for the survey and focusing currents because of possible voltage gradients set up by the survey and focusing currents in the vicinity of this current return electrode. Thus, it is desirable to have the potential reference electrode as far as possible from the survey and focusing electrodes and the current return electrode for the survey and focusing currents.

However, it would be undesirable to place the potential reference electrode at a great distance below the survey and focusing emitting and return electrodes, because of the additional length of the investigating equipment and the impossibility of investigating the bottom of the borehole, since the potential reference electrode would touch bottom while, at the same time, the remainder of the investigating equipment would be disposed far above the potential reference electrode in the borehole. On the other hand, if the potential reference electrode is placed at or near the surface of the earth, serious problems arise because of induced voltages in the conductor connecting the potential reference electrode with the electrical circuitry in the downhole investigating equipment due to mutual inductance between cable conductors along the great length of cable running from the downhole investigating equipment to the surface.

Thus, it is desirable to place the potential reference electrode above the survey and focusing electrodes a reasonable distance which is not so short that the potential reference electrode is unduly influenced by the current emitting and return electrodes of the investigating system, or not so long that undesired voltage components are induced into the conductor connecting the potential reference electrode with the electrical circuitry in the downhole investigating equipment.

Placing the potential reference electrode a reasonable distance above the other electrodes of the investigating system maintains the potential reference electrode free of erroneous voltage components for most operating conditions. However, under certain operating conditions, as for example when there are earth strata having a very high resistivity, ordinary means of investigating subsurface earth formations fail to provide accurate resistivity or conductivity measurements. For example, the survey current emitted from a non-focused investigating system will not be able to penetrate into the high resistivity earth strata to provide resistivity or conductivity indications of the earth formations surrounding that portion of the borehole. Instead, most of the survey current will travel through the borehole, thus providing erroneous resistivity or conductivity readings. Thus, it is desirable to provide a focused type of electrical investigating system to investigate earth strata having the above-mentioned characteristics, so that the survey current will penetrate the high resistivity earth strata.

In earth strata of this type, problems may arise in focused type electrode systems wherein the potential reference electrode is located a reasonable distance above the survey and focusing electrodes and the current return electrode is located a short distance above the survey and focusing electrodes. In this electrode arrangement, when the survey and focusing electrodes are adjacent a conductive earth strata and the current return electrode is adjacent a highly-resistive earth strata, the survey and focusing current will set up a high negative potential on the current return electrode caused by the survey and focusing current returning to the current return electrode through the highly-resistive earth strata from infinity. This high negative potential on the current return electrode will set up a negative potential on the potential reference electrode, which potential may be as high as the potential on the survey and focusing electrodes, thus introducing a very substantial error in the resistivity or conductivity measurements.

It has been found that by placing the survey and focusing electrodes intermediate of the potential reference electrode and the current return electrode with the potential reference electrode located approximately 100 feet above the survey and focusing electrodes, thus enabling the survey and focusing electrodes to shield the potential reference electrode from the current return electrode, solves this problem. However, since the current return electrode is below the survey and focusing electrodes, a problem arises in investigating the earth formations surrounding the bottom portion of the borehole.

It is an object of the invention therefore to provide new and improved methods and apparatus for measuring the electrical resistance properties of earth formations adjacent a borehole.

It is another object of the invention to provide new and improved borehole investigating methods and apparatus for providing more accurate measurements of current flow in a subsurface earth formation.

It is a further object of the invention to provide new and improved borehole invertigating methods and apparatus wherein a more accurate reference voltage is maintained within a downhole electrical circuitry and the earth formations surrounding the bottom portion of the borehole may be investigated.

It is still a further object of the invention to provide new and improved borehole investigating methods and apparatus of the "focused" type in which a more accurate reference voltage is maintained in a downhole electrical circuitry under extreme borehole conditions and the earth formations surrounding the bottom portion of the borehole may be investigated.

In accordance with the present invention, methods and apparatus for investigating earth formations comprises moving a plurality of electrodes having two electrode arrays through the borehole. Current is then supplied to at least one electrode of a first one of the electrode arrays for emission into the surrounding formations, the emitted current returning to at least one electrode of the second electrode array. An electrical parameter of at least one electrode of the first electrode array is then measured to provide a measure of a characteristic of the adjoining formations. Then, the functions of the two electrode arrays are reversed by supplying current to the second electrode array for emission into the surrounding formations, the current returning to at least one electrode of the first electrode array. An electrical parameter of at least one electrode of the second electrode array is then measured in this "reversed" mode of operation.

This reversal of functions of the two electrode arrays is especially desirable in the "focused" type of electrode system where a remote potential reference electrode supplies a constant potential to the downhole investigating circuitry to maintain the current emitting and measuring electrode array at a constant potential. For logging the principal portion of the borehole, the constant potential electrode array is intermediate of the current return electrode array and the remote potential reference electrode so as to shield the remote potential reference electrode from the current return electrode array. However, by reversing the functions of the two electrode arrays, the bottom of the borehole can also be investigated.

For a better understanding of the present invention, together with other and further objects thereof, reference is had to the following description taken in connection with the accompanying drawing, the scope of the invention being pointed out in the appended claims.

The sinble figure of the drawing illustrates a representative embodiment of the earth formation investigating apparatus of the present invention in the borehole together with a schematic diagram of the electrical circuitry utilized with such embodiment.

Referring to the drawing, there is shown a representative embodiment of apparatus constructed in accordance with the present invention for investigating subsurface earth formations 10 traversed by a borehole 11. Borehole 11 is filled with an electrically-conductive drilling fluid (not shown) commonly referred to as "drilling mud." The investigating apparatus includes an electrode array 13, shown at the bottom of the drawing, and an electrode array 14, shown at the top of the drawing. The investigating apparatus also includes a fluid-tight housing 15, located between the electrodes, which contains the electrical circuitry. The dotted line enclosure 15 represents a portion of the fluid-tight housing 15 blown up to a size such that the electrical circuitry may be represented therein. Of course, the actual size of fluid-tight housing is represented by the solid portion 15. The electrode arrays 13 and 14 and the fluid-tight housing 15 are suspended in the borehole 11 by means of an armored, multi-conductor supporting cable 12, only partially shown, which extends to the surface of the earth. The armor of the armored, multi-conductor supporting cable 12 constitutes a potential reference electrode N. The lower 100 feet of the cable 12 immediately above the housing 15 is covered with electrical insulation material 12a.

The conductors which supply the power to the downhole electrical circuitry and the conductors which carry the measurements to the surface are enclosed within the cable 12. The conductors shown running to the surface of the earth, such as conductors 49 and 50, are actually contained within the cable 12, but shown outside the cable 12 for purposes of clarity of the electrical circuit. This cable 12 is connected to a suitable winch mechanism located at the surface of the earth, which raises and lowers the downhole investigating equipment. A recorder 16, which may be, for example, the type shown in U.S. Patent No. 3,181,056, granted to E. H. Boissonas on Apr. 27, 1965, shown at the surface of the earth, has associated therewith a suitable driving mechanism (not shown) which is coupled to the armored supporting cable 12 for advancing the recording medium in step with movement of the downhole apparatus through the borehole 11.

Electrode arrays 13 and 14 both have a survey electrode $A_0$ for emitting survey current into the adjacent earth formations and focusing electrodes $A_1$ for emitting focusing current into the adjacent earth formations to confine the survey current to a path substantially perpendicular to the borehole axis for an appreciable distance. The focusing electrodes $A_1$ of electrode arrays 13 and 14 are connected together by wires 17 and 18 respectively, so that both focusing electrodes $A_1$ on either side of survey electrode $A_0$ will be at the same potential in the particular electrode array.

The investigating apparatus also includes an oscillator 19 which provides a reference voltage to a reference resistor 21 which reference voltage is supplied to one side of primary winding 25 of a transformer 22. The other side of reference resistor 21 is connected to potential reference electrode N which is located on the armor of the armored, multi-conductor cable 12 above the upper electrode array 14. The other side of the primary winding 25 of transformer 22 is connected to the common terminal of double-throw switch 24. All of the double-throw switches shown in housing 15 operate simultaneously and all switches are either in the normally-closed position shown in the drawing or in the opposite position (normally-open) at any given time. Thus, when switch 52, shown at the surface of the earth, is open, relay solenoids 47 and 48 are unenergized and all of the double-throw switches are in the normally-closed positions shown in the drawing. Whenever switch 52 is closed, power supply 57, shown at the surface of the earth, supplies power to relay solenoids 47 and 48, which reverses the positions of the switches to the normally-open contacts.

The normally-closed contact of switch 24 is connected to focusing electrode $A_1$ of lower electrode array 13 and the normally-open contact of switch 24 is connected to focusing electrode $A_1$ of upper electrode array 14. The secondary winding 23 of transformer 22 is connected to the input of constant voltage amplifier 20. The output of constant voltage amplifier 20 is connected to a transformer 27, one side of the secondary winding 28 of which is connected to the common terminal of a double-throw switch 29, and the other side is connected to the common terminal of a double-throw switch 30. The normally-closed contact of switch 29 is connected to focusing electrode $A_1$ of lower electrode array 13 and the normally-open contact of switch 29 is connected to focusing electrode $A_1$ of upper electrode array 14. The switching contacts of double-throw switch 30 are also connected to the focusing electrodes $A_1$ of electrode arrays 13 and 14, but in reverse order from switch 29.

Since all of the double-throw switches shown in housing 15 operate at the same time, it can be seen that one side of the secondary winding 28 of transformer 27 will be connected to the focusing electrode $A_1$ of either electrode array 13 or electrode array 14, while the other side of secondary winding 28 of transformer 27 will be connected to the focusing electrode $A_1$ of the electrode array to which the first-mentioned side of secondary winding 28 of transformer 27 is not connected. Thus, assuming the switch position shown in the drawing, the bottom of secondary winding 28 of transformer 27 is connected through switch 29 to the focusing electrode $A_1$ of lower electrode array 13, while the top of secondary winding 28 is connected through switch 30 to the focusing electrode $A_1$ of upper electrode array 14. When switches 29 and 30 are switched to the other position (normally-open), the bottom of secondary winding 28 will be connected to the focusing electrode $A_1$ of upper electrode array 14 and the top of secondary winding 28 will be connected to the focusing electrode $A_1$ of lower electrode array 13.

The investigating apparatus also includes an amplifier 31, the output of which is connected to a transformer 32. One side of the secondary winding 33 of transformer 32 is connected to the common terminal of a double-throw switch 34. The normally-closed contact of switch 34 is connected to focusing electrode $A_1$ of lower electrode array 13 and the normally-open contact of switch 34 is connected to focusing electrode $A_1$ of upper electrode array 14. The other side of secondary winding 33 of transformer 32 is connected to one side of measure resistor 35. The other side of measure resistor 35 is connected to the common terminal of double-throw switch 36. The normally-closed contact of switch 36 is connected to survey electrode $A_0$ of lower electrode array 13 and the normally-open contact of switch 36 is connected to survey electrode $A_0$ of upper electrode array 14. Also connected across measure resistor 35 is transformer 55, the secondary winding 56 of which is connected to measure amplifier 37. One output from measure amplifier 37 and an output from oscillator 19 are supplied to phase-sensitive detector 38. The other output of measure amplifier 37 is supplied to adding network 39. Also supplied to adding network 39 is the output signal from monitor amplifier 40. The input to monitor amplifier 40 is supplied from transformer 41. One side of the primary winding 42 of transformer 41 is connected to the common terminal of a double-throw switch 43. The normally-closed contact of switch 43 is connected to focusing electrode $A_1$ of lower electrode array 13, while the normally-open contact of switch 43 is connected to focusing electrode $A_1$ of upper electrode array 14. The other side of primary winding 42 of transformer 41 is connected to the common terminal of a double-throw switch 44. The normally-closed contact of switch 44 is connected to survey electrode $A_0$ of lower electrode array 13 and the normally-open contact of switch 44 is connected to survey electrode $A_0$ of upper electrode array 14.

The output from phase-sensitive detector 38 is supplied via leads 45 and 46 through armored, multi-conductor cable 12 to recorder 16 at the surface of the earth.

Now concerning the operation of the embodiment of the present invention shown in the drawing, survey current is emitted from a central survey electrode $A_0$ and confined to a desired lateral flow pattern by focusing current emitted from focusing electrodes $A_1$ on either side of survey electrode $A_0$. In the present embodiment, the voltage magnitudes of the survey and focusing electrodes of one electrode array are maintained equal and of constant magnitude, and the variations of the current supplied to survey electrode $A_0$ of the same electrode array are measured.

With the double-throw switches in the normally-closed positions shown in the drawing, oscillator 19 provides an AC signal of constant voltage magnitude across reference resistor 21, which voltage is constant reference voltage for the operation of the system. This constant reference voltage signal is applied to one side of the primary winding 25 of transformer 22.

Applied to the other side of the primary winding 25 through the normally-closed contact of double-throw switch 24 is the voltage on focusing electrode $A_1$ of lower electrode array 13. A signal proportional to the potential difference between the two input voltages applied to primary winding 25 is induced into secondary winding 23 of transformer 22 and applied to constant voltage amplifier 20. Constant voltage amplifier 20 provides an output voltage to transformer 27 which is indicative of the voltage difference between the two applied input voltages. This voltage is induced across the secondary winding 28 of transformer 27 and applied between the focusing electrode $A_1$ of lower electrode array 13 and the current return point, namely, electrode $A_1$ of electrode array 14. Thus, constant voltage amplifier 20 will provide current to focusing electrode $A_1$ of electrode array 13 of sufficient magnitude to maintain a substantially zero potential difference between the two input voltages applied to the primary winding 25 of transformer 22, that is, the voltage on focusing electrode $A_1$ of electrode array 13 and the constant reference voltage supplied from oscillator 19. Thus, it can be seen that through this feed-back action, the voltage applied to focusing electrode $A_1$ of electrode array 13 will be substantially the same as the reference voltage supplied from oscillator 19, which is the voltage developed across reference resistor 21.

The purpose of the circuitry comprising transformer 41, monitor amplifier 40, adding network 39, amplifier 31, transformer 32, and measure resistor 35, transformer 55, measure amplifier 37 back through adding network 39, is to provide a current to survey electrode $A_0$ of such magnitude as to maintain a substantially zero potential difference between survey electrode $A_0$ and focusing electrode $A_1$. The potential difference between the survey and focusing electrodes $A_0$ and $A_1$ of electrode array 13, is supplied through the normally-closed contacts of double-throw switches 43 and 44 to transformer 41, and then to monitor amplifier 40. Monitor amplifier 40 provides an output voltage indicative of the potential difference between survey and focusing electrodes $A_0$ and $A_1$ of electrode array 13, which voltage is fed to adding network 39. The output voltage from adding network 39 is supplied to amplifier 31. The output voltage from amplifier 31 is supplied to transformer 32, which develops a voltage between survey electrode $A_0$, through measure resistor 35, and focusing electrode $A_1$, both of electrode array 13. The voltage developed across measure resistor 35 is supplied through transformer 55 to measure amplifier 37, whose output is supplied back to adding network 39. Adding network 39 acts to isolate monitor amplifier 40 and measure amplifier 37 from one another as well as combining the two applied inputs.

Thus, it can be seen that monitor amplifier 40 monitors the difference in potential between survey electrode $A_0$ and focusing electrode $A_1$ of electrode array 13, and supplies a signal indicative of this potential difference to adding network 39. A voltage is supplied through amplifier 31, transformer 32 and measure resistor 35 between survey electrode $A_0$ and focusing electrode $A_1$ of electrode array 13, of such magnitude as to reduce the potential difference between electrodes $A_0$ and $A_1$ of electrode array 13 substantially to zero. As seen by the polarity markings across the secondary windings 28 and 33 of transformers 27 and 32 respectively, the voltage supplied to survey electrode $A_0$ from transformer 32 is in adding relationship to the voltage supplied to focusing electrode $A_1$, since there is some resistance associated with secondary winding 33 of transformer 32 causing some voltage loss therethrough from the voltage on focusing electrode $A_1$.

The current through measure resistor 35 is the total current supplied to survey electrode $A_0$, and as such, is the current to be measured to provide an indication of, in this case, conductivity since the voltage is being held constant. This survey current develops a voltage across measure resistor 35 which voltage is induced in the secondary winding 56 of transformer 55, and amplified by measure amplifier 37. Phase-sensitive detector 38 receives a phase-reference signal from oscillator 19 and detects the component of voltage from measure amplifier 37 which is in phase with this applied reference signal, providing a DC signal proportional to this amount via conductor 45 and 46 to the recording equipment at the surface of the earth. The output voltage from measure amplifier 37 is also supplied to adding network 39 to offset the voltage loss due to measure resistor 35. This positive feed-back network through measure amplifier 37 lessens the gain requirements on the negative feed-back loop through monitor amplifier 40.

For a further explanation of the feed-back circuits associated with amplifier 31, see U.S. Patent No. 3,031,612 granted to M. F. Easterling on Apr. 24, 1962.

It can now be seen that the reference voltage supplied from oscillator 19 must be constant so that the voltage supplied to the survey and focusing electrodes $A_0$ and $A_1$ of the investigating electrode array can also be constant, since the accuracy of the current variation measurements across measuring resistor 35 assumes a constant voltage on survey electrode $A_0$ of the investigating electrode array, However, if the voltage of the potential reference electrode N varies, the reference voltage applied to the survey and focusing electrodes $A_0$ and $A_1$ will also vary, since the reference voltage is determined with respect to potential reference electrode N. Variations of the voltage on the potential reference electrode N may result from the voltage gradient caused by the survey and focusing electrodes or the current return electrode, Thus, it is undesirable to locate the potential reference electrode N too close to either the survey and focusing emitting or current return electrodes, or between the two because of this voltage gradient. If the potential reference electrode N is placed below the survey electrode, the bottom of the borehole cannot be investigated and if placed a great distance above, the mutual inductance between conductors becomes a serious problem.

This voltage gradient problem becomes especially acute under certain adverse borehole conditions, as for example, when some layers of earth strata surrounding a borehole have high resistivity values. Under these adverse borehole conditions, a focused type of investigating system is required to force the survey current outward into the surrounding earth formation. Because of the high resistivity of the surrounding earth formations the survey current from a non-focused system would not penetrate laterally into the surrounding earth formation but would travel through the mud in the borehole, thus giving the resistivity of the mud rather than the surrounding earth formations.

In a focused type system, it has been found that it is desirable to place the potential reference electrode N a prescribed distance above the other electrodes of the investigating system. This prescribed distance must be great enough so that the potential reference electrode will not be so close to the other electrodes of the investigating system as to be influenced by the voltages thereon and yet not so great as to have appreciable undesired voltages induced in the conductor connecting the potential reference electrode N with the downhole electrical circuitry. It has been found that a distance of 100 feet meets these requirements. However, problems may still arise under the above-mentioned adverse borehole conditions when the current return electrode is mounted between the potential reference electrode and the survey and focusing electrodes.

When the survey and focusing electrodes $A_0$ and $A_1$ are opposite a conductive earth strata and the current return electrode is opposite a highly-resistive earth strata, the current emitted from the survey and focusing electrodes $A_0$ and $A_1$ will travel to infinity through the conductive earth strata causing a relatively high current flow and the same current will return to the current return electrode from infinity. This survey and focusing current returning from infinity to the current return electrode through a highly-resistive earth strata will set up a large negative potential on the current return electrode. If the current return electrode is located between survey and focusing electrodes $A_0$ and $A_1$ and potential reference electrode N, this high negative potential will cause a negative potential to exist on potential reference electrode N, the magnitude of this potential reference partly dependent on the distance that potential reference electrode N is from the current return electrode. However, as stated before, potential reference electrode N cannot be too far from the current return electrode because of the induced voltage on the conductor connecting potential reference electrode N with the downhole electrical circuitry, which conductor runs through armored, multiconductor cable 12.

However, it has been discovered that if the current return electrode is located on the opposite side of the survey and focusing electrodes $A_0$ and $A_1$ from potential reference electrode N, the survey and focusing electrodes $A_0$ and $A_1$ will, in effect, shield potential reference electrode N from the current return electrode. Since the survey and focusing electrodes $A_0$ and $A_1$ remain at a constant potential, relatively low in comparison to the potential which may exist on the current return electrode under the above-described adverse borehole conditions, there will be very little, if any, potential on remote potential reference electrode N due to survey and focusing electrodes $A_0$ and $A_1$, even under these extreme borehole conditions. It has been found after a great amount of experimentation that if the current return electrode B is placed 20 feet from the nearest point on focusing electrode $A_1$ to $B_1$ the desired amount of focusing action is obtained and the downhole investigating equipment is easy to handle.

However, if the current return electrode is located below survey and focusing electrodes $A_0$ and $A_1$, a problem arises in that the portion of the earth formation surrounding the bottom of the borehole cannot be investigated. To solve this problem, two separate electrode arrays are provided, namely, the upper array 14 and the lower array 13. During the investigation throughout most of the length of the borehole, the upper electrode array 14 is the current emitting one used to perform the resistivity or conductivity measurements. At this time, the lower electrode array 13 is used merely as a current return electrode for the survey and focusing currents emitted by the upper array 14. Near the bottom of the borehole, the functions of the two electrode arrays are reversed so that the lower electrode array 13 becomes the active current emitting array which is making the measurement, and the upper array 14 serves as a current return electrode. In this manner, the voltage on the potential reference electrode N can be maintained substantially constant, at zero volts, for most of the survey even under extreme borehole conditions and yet the earth formations surrounding the bottom portion of the borehole may also be investigated.

The configuration utilized throughout most of the borehole is where the normally-open contacts of the double-throw switches are connected to the common terminals of the switches (opposite from switch positions shown in the drawing). In this case, switch 52 at the surface of the earth is closed, thus energizing solenoids 47 and 48 from power source 57. Thus, the upper electrode array 14 acts as the survey and focusing emitting electrode array, and lower electrode array 13 acts as the survey and focusing current return electrode. Upon nearing the bottom of the borehole, switch 52 is opened, releasing power from solenoids 47 and 48, thus switching all of the double-throw switches to their normally-closed positions. Lower electrode array 13 then becomes the active survey and focusing emitting electrode array and upper electrode array 14 becomes the survey and focusing current return electrode. The electrical circuitry within housing 15 operates in the same manner which ever position the double-throw switches are in.

It is to be understood that the particular type of focused electrode systems shown as electrode arrays 13 and 14 in FIG. 1 are only illustrative and electrode arrays 13 and 14 could comprise any other type of focused electrode system, as for example, the 7 electrode focused configuration shown in FIG. 1 of U.S. Patent No. 3,034,041 granted to N. A. Schuster on May 8, 1962.

The depth in the borehole at which the measurement is obtained is the depth of survey electrode $A_0$ of whichever electrode array is emitting current. Thus, in the normally-closed switch positions shown in the drawing, the measurment depth is the depth survey electrode $A_0$ of lower electrode array 13. The area surrounding the borehole in a radial direction from the survey electrode $A_0$ of this current emitting electrode array contributes most of the resistance to the measurement because of the focusing action. Since the depth indicator connected to recorder 16 is initially adjusted to indicate only the depth of upper electrode array 14, a depth correction must be made when lower electrode array 13 is the current emitting investigating electrode array. The driving mechanism associated with recorder 16 is adjusted to record the depth of lower electrode array 13 whenever lower electrode array 13 is the investigating electrode array.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In apparatus for investigating earth formations traversed by a borehole, the combination comprising:
    (a) a plurality of electrodes having two electrode arrays, each electrode array having at least one survey electrode and at least one focusing electrode;
    (b) means for supplying current to the survey and focusing electrodes within a first one of the electrode arrays for emission into the surrounding earth formations, the focusing current confining the survey current to a desired flow pattern;
    (c) current return means, coupled to at least one of the electrodes within the other electrode array, which electrode is adapted to emit current, for returning the current emitted by the first electrode array back to the first-named means;
    (d) measuring means coupled to at least one electrode of the first electrode array for measuring an electrical parameter of at least one electrode of the first electrode array to provide a measure of a characteristic of the adjoining formations; and
    (e) switching means for switching the current being supplied to the electrodes of the first electrode array to being supplied to the survey and focusing electrodes of the second electrode array for emission into the surrounding earth formations and switching the current return means from said at least one electrode of said other electrode array to at least one electrode of the first electrode array and switching the measuring means to at least one electrode of said other electrode array whereby a measure of a characteristic of the adjoining formations can be obtained from either the first or second electrode arrays by reversing the functions of electrode arrays.

2. In apparatus for investigating earth formations traversed by a borehole, the combination comprising:
    (a) a plurality of electrodes having two electrode arrays with mutually exclusive electrodes, at least one electrode within each electrode array adapted to emit current into the surrounding earth formation;
    (b) means for supplying current to at least one current emitting electrode within a first one of the electrode arrays;
    (c) means, coupled to at least one of the electrodes within the second electrode array, which electrode is adapted to emit current, for returning the current emitted by the first electrode array back to the first-named means;
    (d) measuring means coupled to said current emitting electrode of the first electrode array for measuring an electrical parameter of said electrode to provide a measure of a characteristic of the adjoining formations; and
    (e) means for switching (1) the current supplied to the electrode within the first electrode array to being supplied to at least one current emitting electrode within the second electrode array, (2) the current returned to the first-named means from the electrode within the second electrode array to being returned from ta least one electrode within the first electrode array, and (3) the measuring means from the electrode of the first electrode array, so as to be operably disconnected therefrom, to said current emitting electrode of the second electrode array to provide a measure of an electrical parameter of said current emitting electrode of the second electrode array so that the functions of the two electrode arrays can be reversed.

3. In apparatus for investigating earth formations traversed by a borehole, the combination comprising:
    (a) a plurality of electrodes having an upper and lower electrode array with mutually exclusive electrodes, at least one electrode within each electrode array adapted to emit current into the surrounding earth formations;
    (b) means for supplying current to at least one current emitting electrode within the lower electrode array, said current emitting electrode emitting current into the adjacent earth formations for investigating the adjacent earth formations near the bottom of the borehole;
    (c) at least one electrode, adapted to emit current, within the upper electrode array;
    (d) means, coupled to the electrode within the upper electrode array for returning the current emitted by the lower electrode array, which current is returned to the electrode within the upper electrode array, back to the first-named means;
    (e) measuring means coupled to at least one electrode of the lower electrode array for measuring an electrical parameter of said at least one electrode of the lower electrode array to provide a measure of a characteristic of the adjoining formations;
    (f) means for switching the current supplied to said current emitting electrode within the lower electrode array, to being supplied to said at least one electrode within the upper electrode array for investigating the earth formations surrounding the remainder of the borehole;
    (g) means for switching the current returned to the first-named means, from the electrode within the upper electrode array to being returned from said current emitting electrode within the lower electrode array; and
    (h) means for operably disconnecting the measuring means from said at least one electrode of the lower electrode array and connecting said measuring means to at least one electrode of the upper electrode array.

4. An apparatus for investigating earth formations traversed by a borehole, the combination comprising:
(a) a plurality of electrodes having upper and lower electrode arrays and a remote potential reference electrode, at least one electrode within each electrode array adapted to emit current into the surrounding earth formation;
(b) means for supplying current to at least one current emitting electrode of the lower electrode array for emission into the surrounding earth formations, the emitted current returning to at least one electrode of the upper electrode array;
(c) control means for maintaining the potential of said at least one electrode of the lower electrode array constant with respect to the potential of the remote potential reference electrode;
(d) means, coupled to at least one of the electrodes within the upper electrode array, which electrode is adapted to emit current, for returning the current emitted by the lower electrode array back to the first-named means;
(e) measuring means for measuring an electrical parameter of at least one electrode of the lower electrode array to provide a measure of a characteristic of the adjoining formations;
(f) means for switching the current supplied to the electrode within the lower electrode array, to being supplied to at least one electrode within the upper electrode array;
(g) means for switching the current returned to the first-named means from the electrode within the upper electrode array, to being returned from the electrode within the lower electrode array;
(h) means for switching the control means from the lower electrode array to the upper electrode array to maintain the potential of at least one electrode of the upper electrode array at a constant potential with respect to the remote potential reference electrode; and
(i) means for switching the measuring means from the lower electrode array to at least one electrode of the upper electrode array, whereby the remote potential reference electrode is electrically shielded from the current return lower electrode array by the upper current emitting, constant potential electrode array and the bottom of the borehole can be investigated by reversing the functions of the upper and lower electrode arrays.

5. In apparatus for investigating earth formations traversed by a borehole, the apparatus of the type where a potential reference electrode is coupled to the downhole investigating circuitry to provide a reference potential approximating zero volts, the combination comprising:
(a) a plurality of electrodes adapted for movement through the borehole, the electrodes including:
(1) two electrode arrays, each electrode array having at least one survey electrode and at least one focusing electrode;
(2) the potential reference electrode;
(b) means for supplying current to the survey and focusing electrodes within a first one of the electrode arrays for emission into the surrounding earth formations, the focusing current confining the survey current to a desired flow pattern;
(c) means for maintaining the potential on at least the focusing electrode of the first electrode array at a constant potential with respect to the potential reference electrode;
(d) means, coupled to said at least one focusing electrode within the second electrode array for returning the current emitted by the first electrode array back to the first-named means;
(e) measuring means for measuring the current supplied to the survey electrode of the first electrode array to provide a measure of the conductivity of the adjoining formations;
(f) means for switching
(1) the current being supplied to the first electrode array to being supplied to the second electrode array;
(2) the current returned to the first-named means from said at least one focusing electrode within the second electrode array to being returned from said at least one focusing electrode within the first electrode array; and
(3) the measuring means for measuring the current supplied to the survey electrode of the first electrode array to measuring the current supplied to the survey electrode of the second electrode array whereby the functions of the two electrode arrays may be reversed.

6. In apparatus for investigating earth formations traversed by a borehole, the combination comprising:
(a) a plurality of electrodes adapted for movement through the borehole, the electrodes including:
(1) upper and lower electrode arrays, at least one electrode within each array adapted to emit current; and
(2) a potential reference electrode located above both of the two electrode arrays;
(b) means for supplying current to said at least one electrode within the lower electrode array for emission into the surrounding earth formations, the current returning to said at least one electrode within the upper electrode array;
(c) means for supplying a substantially constant voltage to the first-named means, the voltage substantially constant with respect to the potential reference electrode;
(d) means, coupled to said at least one electrode within the upper electrode array for returning the current emitted from said at least one electrode within the lower electrode array back to the first-named means;
(e) measuring means for measuring an electrical parameter of at least one electrode of the lower electrode array to provide a measure of a characteristic of the adjoining formations;
(f) means for switching
(1) the current supplied to said at least one electrode within the lower electrode array to being supplied to said at least one electrode within the upper electrode array;
(2) the current returned to the first-named means from said at least one electrode within the upper electrode array to being returned from said at least one electrode within the lower electrode array; and
(3) the measuring means from measuring a parameter of the lower electrode array, so as to be operably disconnected therefrom, to measuring an electrical parameter of at least one electrode of the upper electrode array, whereby the upper electrode array electrically shields the potential reference electrode from the lower electrode array yet the bottom of the borehole can be investigated by reversing the functions of the upper and lower electrode arrays.

7. A method of investigating earth formation traversed by a borehole comprising the steps of:
moving a plurality of electrodes through the borehole, said electrodes including two separate, spaced apart electrode arrays having mutually exclusive electrodes arranged for investigating earth formations adjacent to a borehole;
supplying current to at least one electrode of a first electrode array for emission into the surrounding earth formations, the current returning to at least one electrode of a second electrode array;

measuring, with a measuring means, an electrical parameter of said at least one current emitting electrode of the first electrode array in response to current emitted from the first electrode array to provide a measure of a characteristic of the adjoining formations;

switching at a later time the current supplied to the first electrode array to at least one electrode of the second electrode array, the current returning to at least one electrode of the first electrode array; and measuring an electrical parameter of said at least one current emitting electrode of the second electrode array in response to current emitted from the second electrode array to provide a measure of a characteristic of the adjoining formations, the measuring means being operably disconnected from said at least one electrode of the first electrode array.

8. A method of investigating earth formation traversed by a borehole comprising the steps of:

moving a plurality of electrodes through the boreholes, said electrodes including two electrode arrays for investigating earth formations adjacent to a borehole;

supplying current to at least one electrode of a first electrode array for emission into the earth formations immediately adjacent to the first electrode when said first electrode array is substantially near the bottom of the borehole for investigating the earth formations near the bottom of the borehole, the current returning to at least one electrode of a second electrode array;

measuring, with a measuring means, an electrical parameter of at least one electrode of the first electrode array in response to the current emitted from the first electrode array to provide a measure of a characteristic of the adjoining formations;

switching, at a later time, the current supplied to the first electrode array to the second electrode array for investigating the remainder of the earth formations, the emitted current returning to at least one electrode of the first electrode array; and measuring an electrical parameter of at least one electrode of the second electrode array in response to the current emitted from the second electrode array to provide a measure of a characteristic of the adjoining formations, the measuring means being operably disconnected from at least one electrode of the first electrode array.

9. A method of investigating earth formations traversed by a borehole comprising the steps of:

moving a plurality of electrodes through the borehole, said electrodes including two electrode arrays for separately investigating earth formations adjacent to a borehole, and a remote potential reference electrode located above both of said electrode arrays;

supplying a signal of substantially constant voltage with respect to the potential reference electrode to at least one electrode of a lower electrode array for emission into the surrounding earth formation when said first electrode array is substantially near the bottom of the borehole, the signal returning to at least one electrode of an upper electrode array;

measuring, with a measuring means, an electrical parameter of at least one electrode of the lower electrode array in response to the current emitted from the lower electrode array to provide a measure of a characteristic of the adjoining formations;

switching the signal supplied to the lower electrode array to the upper electrode array for investigating the remainder of the formations, the current returning to at least one electrode of the lower electrode array; and measuring an electrical parameter of at least one electrode of the upper electrode array to provide a measure of a characteristic of the adjoining formations, whereby the remote potential reference electrode is electrically shielded from the current return lower electrode array by the upper current emitting, constant voltage electrode array and the bottom of the borehole can be investigated by reversing the functions of said upper and lower electrode arrays, the measuring means being operably disconnected from said at least one electrode of the lower electrode array.

10. A method of investigating earth formations traversed by a borehole comprising the steps of:

moving a plurality of electrodes through the borehole, said electrodes including two electrode arrays, each having survey and focusing electrodes for separately investigating earth formations adjacent to a borehole;

supplying survey and focusing current from a current source to both the survey and focusing electrodes of a first electrode array for emission into the earth formations immediately adjacent to the first electrode for investigating the earth formations immediately adjacent to the first electrode, the survey and focusing current returning to at least one electrode of a second electrode array to be returned to the current source;

measuring an electrical parameter of at least one electrode of the first electrode array in response to at least a portion of the current emitted from the first electrode array to provide a measure of a characteristic of the adjoining formations;

switching the survey and focusing current supplied to the survey and focusing electrodes of the first electrode array to survey and focusing electrodes of the second electrode array for emission into the earth formations, the emitted current returning at least one electrode of the first electrode array, and simultaneously switching the current returning from said at least one electrode of the second electrode array to the current source to being returned from at least one electrode of the first electrode array; and measuring an electrical parameter of at least one electrode of the second electrode array in response to at least a portion of the current emitted from the second electrode array to provide a measure of a characteristic of the adjoining formations.

References Cited

UNITED STATES PATENTS

| | | | |
|---|---|---|---|
| 2,872,638 | 2/1959 | Jones | 324—1 |
| 3,103,626 | 9/1963 | Burton et al. | 324—1 |
| 3,219,921 | 11/1965 | Bricaud | 324—1 |
| 3,262,050 | 7/1966 | Threadgold et al. | 324—10 |
| 2,707,768 | 5/1955 | Owen | 324—10 XR |
| 2,779,912 | 1/1957 | Waters | 324—10 XR |
| 2,937,333 | 5/1960 | Boucherot | 324—1 |

RUDOLPH V. ROLINEC, *Primary Examiner.*

G. R. STRECKER, *Assistant Examiner.*